United States Patent
Tsujii et al.

(10) Patent No.: US 11,784,489 B2
(45) Date of Patent: Oct. 10, 2023

(54) SUPPLY AND DEMAND ADJUSTMENT MONITORING DEVICE OF POWER GRID AND SUPPLY AND DEMAND ADJUSTMENT MONITORING METHOD FOR POWER GRID

(71) Applicant: HITACHI, LTD., Tokyo (JP)

(72) Inventors: Yuki Tsujii, Tokyo (JP); Toshiyuki Furukawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 496 days.

(21) Appl. No.: 17/046,318

(22) PCT Filed: Feb. 8, 2019

(86) PCT No.: PCT/JP2019/004604
§ 371 (c)(1),
(2) Date: Oct. 9, 2020

(87) PCT Pub. No.: WO2019/220706
PCT Pub. Date: Nov. 21, 2019

(65) Prior Publication Data
US 2021/0151989 A1 May 20, 2021

(30) Foreign Application Priority Data
May 17, 2018 (JP) .................... 2018-095045

(51) Int. Cl.
| | |
|---|---|
| H02J 3/00 | (2006.01) |
| G06Q 10/04 | (2023.01) |
| G06Q 50/06 | (2012.01) |
| H02J 3/38 | (2006.01) |
| H02J 3/46 | (2006.01) |
| H02J 3/24 | (2006.01) |
| H02J 13/00 | (2006.01) |

(52) U.S. Cl.
CPC .............. *H02J 3/004* (2020.01); *G06Q 10/04* (2013.01); *G06Q 50/06* (2013.01); *H02J 3/003* (2020.01);
(Continued)

(58) Field of Classification Search
CPC .. H02J 3/004; H02J 3/003; H02J 3/008; H02J 3/24; H02J 3/381; H02J 3/46;
(Continued)

(56) References Cited

U.S. PATENT DOCUMENTS

| | | | | |
|---|---|---|---|---|
| 2012/0010758 A1* | 1/2012 | Francino | ................ | G05B 17/02 700/291 |
| 2015/0184550 A1* | 7/2015 | Wichmann | ............. | G05B 13/04 700/287 |

(Continued)

FOREIGN PATENT DOCUMENTS

| | | |
|---|---|---|
| JP | 2006-254649 A | 9/2006 |
| JP | 2016-062191 A | 4/2016 |

(Continued)

OTHER PUBLICATIONS

International Search Report of PCT/JP2019/004604 dated Apr. 2, 2019.

*Primary Examiner* — Ziaul Karim
(74) *Attorney, Agent, or Firm* — MATTINGLY & MALUR, PC

(57) ABSTRACT

A supply and demand adjustment monitoring device of a power grid includes an output actual power value database that stores an output actual power value of at least one generator, an output power command value database that stores an output power command value issued to the generator, a planned adjustment capacity value database that stores a planned adjustment capacity value for the generator, and an adjustment capacity evaluation unit that evaluates an adjustment capacity based on the output actual power value, the output power command value, and the planned adjustment capacity value.

5 Claims, 13 Drawing Sheets

(52) U.S. Cl.
CPC ............... *H02J 3/008* (2013.01); *H02J 3/24*
(2013.01); *H02J 3/381* (2013.01); *H02J 3/46*
(2013.01); *H02J 13/00002* (2020.01); *H02J*
*2203/20* (2020.01); *H02J 2300/22* (2020.01);
*H02J 2300/28* (2020.01)

(58) Field of Classification Search
CPC ............. H02J 13/00002; H02J 2203/20; H02J
2300/22; H02J 2300/28; G06Q 10/04;
G06Q 50/06; Y02E 60/00; Y04S 10/123;
Y04S 10/30; Y04S 40/20
See application file for complete search history.

(56) References Cited

U.S. PATENT DOCUMENTS

| | | | |
|---|---|---|---|
| 2015/0185716 A1* | 7/2015 | Wichmann | F02C 9/28 |
| | | | 700/287 |
| 2016/0261115 A1* | 9/2016 | Asati | H02J 13/00 |
| 2017/0364043 A1* | 12/2017 | Ganti | G05B 17/02 |
| 2018/0025423 A1* | 1/2018 | Utsumi | G06Q 10/04 |
| | | | 705/37 |
| 2018/0128863 A1* | 5/2018 | Utsumi | G06Q 50/06 |

FOREIGN PATENT DOCUMENTS

| | | |
|---|---|---|
| JP | 2016-093016 A | 5/2016 |
| JP | 2016-134939 A | 7/2016 |
| WO | 2016/063660 A1 | 4/2016 |

\* cited by examiner

FIG. 5

| GENERATOR | EVALUATED IMBALANCE [%] | RESPONSE SPEED [MW/%] | CAPACITY [MW] |
|---|---|---|---|
| A | 0.5 | 10 (PLANNED VALUE ○○) | 20 (PLANNED VALUE ○○) |
| B | 1.4 | 5 (PLANNED VALUE ○○) | 15 (PLANNED VALUE ○○) |
| ⋮ | | | |
| Z | 0.8 | 15 (PLANNED VALUE ○○) | 30 (PLANNED VALUE ○○) |

FIG. 9

| GENERATOR | PREDICTED VALUE OF RESPONSE SPEED [MW/%] | PREDICTED VALUE OF CAPACITY [MW] |
|---|---|---|
| A | △△ (PLANNED VALUE ○○) | △△ (PLANNED VALUE ○○) |
| B | △△ (PLANNED VALUE ○○) | △△ (PLANNED VALUE ○○) |
| ⋮ | | |
| Z | △△ (PLANNED VALUE ○○) | △△ (PLANNED VALUE ○○) |

FIG. 13

| GENERATOR | PREDICTED VALUE OF RESPONSE SPEED [MW/%] | PREDICTED VALUE OF CAPACITY [MW] |
|---|---|---|
| A | △△ (PLANNED VALUE ○○) | △△ (PLANNED VALUE ○○) |
| B | △△ (PLANNED VALUE ○○) | △△ (PLANNED VALUE ○○) |
| ⋮ | | |
| Z | △△ (PLANNED VALUE ○○) | △△ (PLANNED VALUE ○○) |

SUPPLY AND DEMAND ADJUSTMENT MONITORING DEVICE OF POWER GRID AND SUPPLY AND DEMAND ADJUSTMENT MONITORING METHOD FOR POWER GRID

TECHNICAL FIELD

The present invention relates to a supply and demand adjustment monitoring device of a power grid, and a supply and demand adjustment monitoring method for a power grid.

BACKGROUND ART

To maintain stable supply of electric power, it is necessary to adjust balance between power supply and demand and stably maintain a frequency. Especially, as the introduction of renewable energy progresses, the adjustment of balance between power supply and demand is becoming more important. Currently, general power transmission and distribution companies procure adjustment capacities by public offering for the purpose of adjusting balance between power supply and demand.

A supply and demand adjustment market in which adjustment capacities are traded will be established in the future. General power transmission and distribution companies will procure adjustment capacities in this market. To maintain the stability of a frequency, it is necessary to predict whether an adjustment capacity required to maintain the stability can be sufficiently secured and to adjust balance between power supply and demand based on the prediction.

As a conventional technique for predicting the amount of power to be generated for trading in a power trading market, there is Japanese Patent Application No. 2016-062191 (Patent Literature 1). Patent Literature 1 discloses a technique for optimally distributing bid quantities in multiple markets in consideration of a difference between the accuracy of predicting the amount of power to be generated for a current day and the accuracy of predicting the amount of power to be generated for a previous day.

CITATION LIST

Patent Literature

Patent Literature 1: Japanese Patent Application No. 2016-062191

SUMMARY OF INVENTION

Technical Problem

However, Patent Literature 1 describes the prediction of a future amount of power to be generated and the distribution of a bid quantity, but does not disclose a technique for determining whether a required adjustment capacity can be secured. When a required adjustment capacity cannot be secured, it may not be possible to stably supply electric power.

Therefore, an object of the invention is to provide a supply and demand adjustment monitoring device of a power grid that can secure a required adjustment capacity and to stably supply electric power.

Solution to Problem

To solve the foregoing problem, according to the invention, a supply and demand adjustment monitoring device of a power grid includes an output actual power value database that stores an output actual power value of at least one generator, an output power command value database that stores an output power command value issued to the generator, a planned adjustment capacity value database that stores a planned adjustment capacity value for the generator, and an adjustment capacity evaluation unit that evaluates an adjustment capacity based on the output actual power value, the output power command value, and the planned adjustment capacity value.

Advantageous Effects of Invention

According to the invention, it is possible to provide a supply and demand adjustment monitoring device of a power grid that can secure a required adjustment capacity and to stably supply electric power.

BRIEF DESCRIPTION OF DRAWINGS

FIG. 5 illustrates an example of a screen display showing the evaluation indices of the supply and demand adjustment monitoring device of the power grid according to the first embodiment of the invention.

FIG. 9 illustrates an example of a screen display showing prediction results of the supply and demand adjustment monitoring device of the power grid according to the second embodiment of the invention.

FIG. 13 illustrates an example of a screen display showing prediction results of the supply and demand adjustment monitoring device of the power grid according to the third embodiment of the invention.

DESCRIPTION OF EMBODIMENTS

Hereinafter, embodiments of the invention are described. The following merely describes the embodiments and does not intend that the invention is limited to the following specific details.

First Embodiment

A supply and demand adjustment monitoring device according to a first embodiment of the invention is described with reference to FIGS. 1 to 5.

Figure 1:
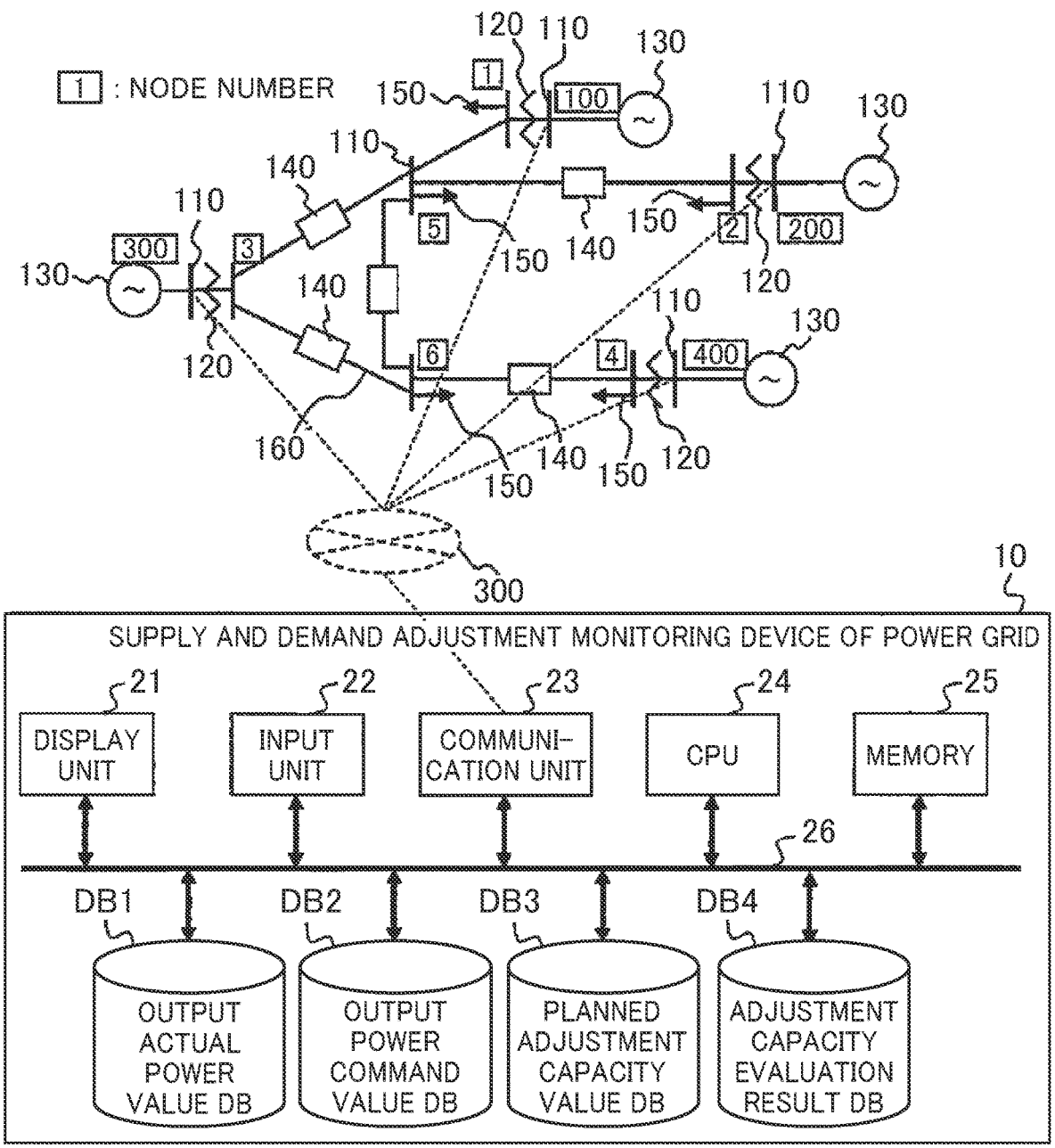
FIG. 1 illustrates an example of a hardware configuration diagram of a supply and demand adjustment monitoring device according to a first embodiment of the invention and a power grid for which the supply and demand adjustment monitoring device is used.

FIG. 1 is a conceptual diagram illustrating examples of hardware configurations of the supply and demand adjustment monitoring device 10 according to the first embodiment and a power grid 1 for which the supply and demand adjustment monitoring device 10 is used. An upper part of FIG. 1 illustrates the example of the configuration of the power grid 1, while a lower part of FIG. 1 illustrates the example of the configuration of the supply and demand adjustment monitoring device 10.

The power grid 1 includes a node 110, a transformer 120, a plurality of generators 130, a power transmission line 140, and a load 150. In FIG. 1, a node number is given to the node 110. In the node 110, various measurers (not illustrated) for protecting, controlling, and monitoring the power grid are installed.

The plurality of generators 130 coordinate with the load 150 via the node 110, the transformer 120, the power transmission line 140, and the like.

A communication network 300 connects the power grid 1 to the supply and demand adjustment monitoring device 10. Measurement data measured by the measurers is converted into signals. The signals are transmitted to a communication unit 23 of the supply and demand adjustment monitoring device 10 for the power grid via the communication network 300. The communication unit 23 is described later.

The supply and demand adjustment monitoring device 10 is composed of a computer system and includes a display unit 21, such as a display device, an input unit 22, such as a keyboard or a mouse, the communication unit 23, a CPU 24, a memory 25, and various databases DB. The units, the memory, and the databases are connected to a bus line 26.

The display unit 21 displays input image data. For example, the display unit 21 may be configured to use a printer device, an audio output device, or the like, instead of or together with a display device.

The input unit 22 may include at least one of a pointing device, such as a keyboard switch or a mouse, a touch panel, an audio instruction device, and the like.

The communication unit 23 includes a circuit and a communication protocol that are configured for connection to the communication network.

The CPU 24 executes a calculation program to specify image data to be displayed, search for data within the various databases, and the like. The CPU 24 may be configured as one or multiple semiconductor chips or may be configured as a computer device, such as a calculation server.

The memory 25 is configured as a random-access memory (RAM) and stores a computer program, calculation result data necessary for processes, image data, and the like. The image data stored in the memory 25 is transmitted to and displayed by the display unit 21.

The databases DB are an output actual power value database DB1, an output power command value database DB2, a planned adjustment capacity value database DB3, and an adjustment capacity evaluation result database DB4, and may include another database when necessary.

Data measured by the measurers installed in the node 110 of the power grid 1 is stored in the various databases DB of the supply and demand adjustment monitoring device 10 via the communication network 300.

Figure 2:
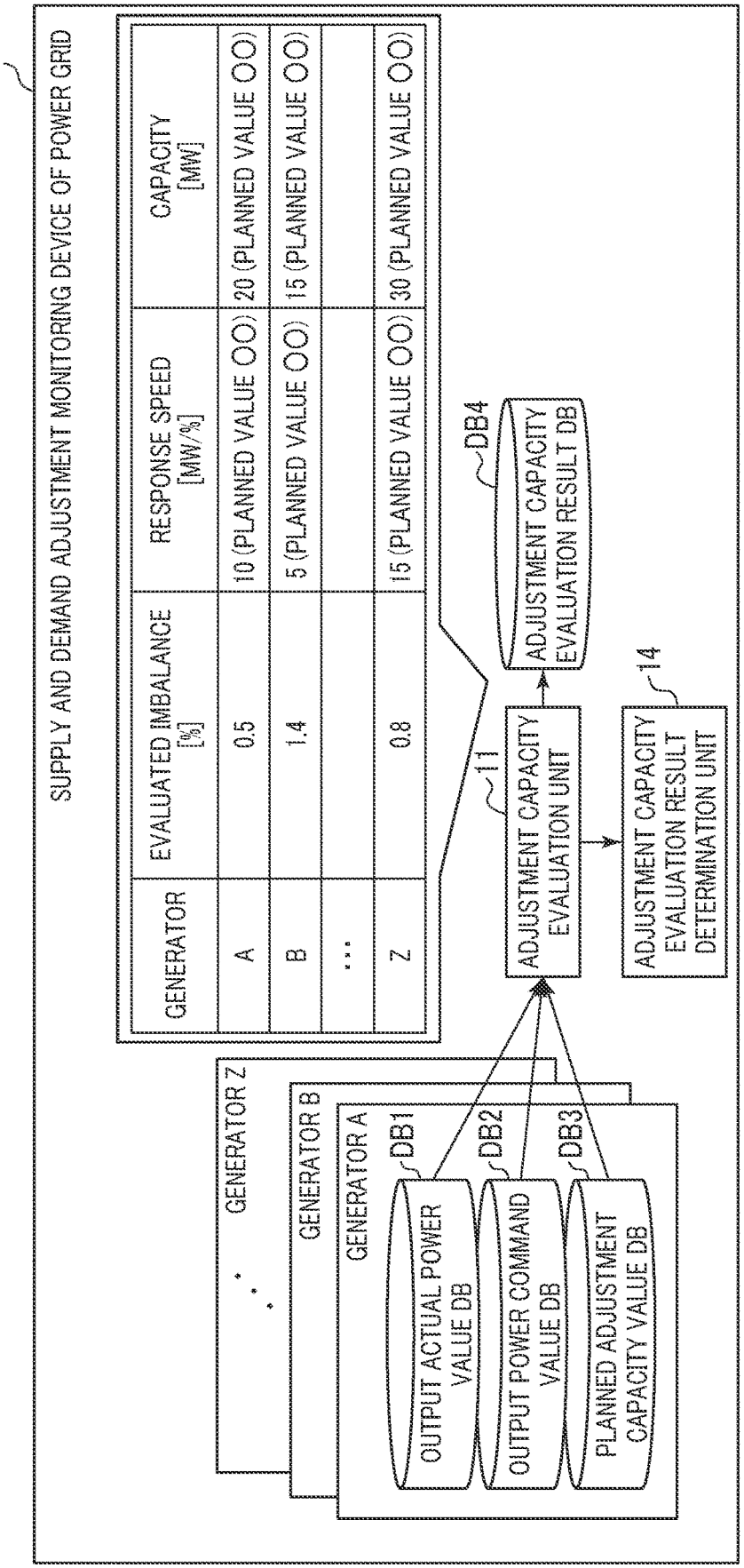
FIG. 2 is an example of a software configuration diagram of the supply and demand adjustment monitoring device of the power grid according to the first embodiment of the invention.

FIG. 2 is a conceptual diagram illustrating a software configuration of the supply and demand adjustment monitoring device 10 of the power grid according to the present embodiment.

The supply and demand adjustment monitoring device 10 is composed of the computer system and includes the output actual power value database DB1, the output power command value database DB2, the planned adjustment capacity value database DB3, the adjustment capacity evaluation result database DB4, an adjustment capacity evaluation unit 11, and an adjustment capacity evaluation result determination unit 14. The various databases DB may be provided for generators to be monitored for adjustment of power supply and demand. Alternatively, the various databases DB may be provided for the plurality of generators.

In the output actual power value database DB1, output actual power values of one or multiple generators 130 are stored. The output actual power values are actually output by the one or multiple generators at unit time intervals.

In the output power command value database DB2, output power command values issued to the one or multiple generators 130 are stored. The output power command values are determined by calculation for output distribution at unit time intervals and transmitted to the one or multiple generators.

In the planned adjustment capacity value database DB3, planned adjustment capacity values (response speed, capacity, and the like) of the one or multiple generators 130 are stored.

In the adjustment capacity evaluation result database DB4, adjustment capacity evaluation results (evaluated imbalance, response speed, capacity, and the like) of the one or multiple generators 130 are stored.

The adjustment capacity evaluation unit 11 acquires the output actual power values stored in the output actual power value database DB1, the output power command values stored in the output power command value database DB2, and the planned adjustment capacity values stored in the planned adjustment capacity value database DB3 and uses these values as input to evaluate adjustment capacities by a method described later. Adjustment capacity evaluation results of evaluating the adjustment capacities are output from the adjustment capacity evaluation unit 11 and stored in the adjustment capacity evaluation result database DB4.

The adjustment capacity evaluation result determination unit 14 determines whether the adjustment capacity evaluation results output from the adjustment capacity evaluation unit 11 satisfy an adjustment capacity determination value. The adjustment capacity determination value according to the present embodiment is a threshold set in advance, a planned adjustment capacity value, or the like.

Figure 3:
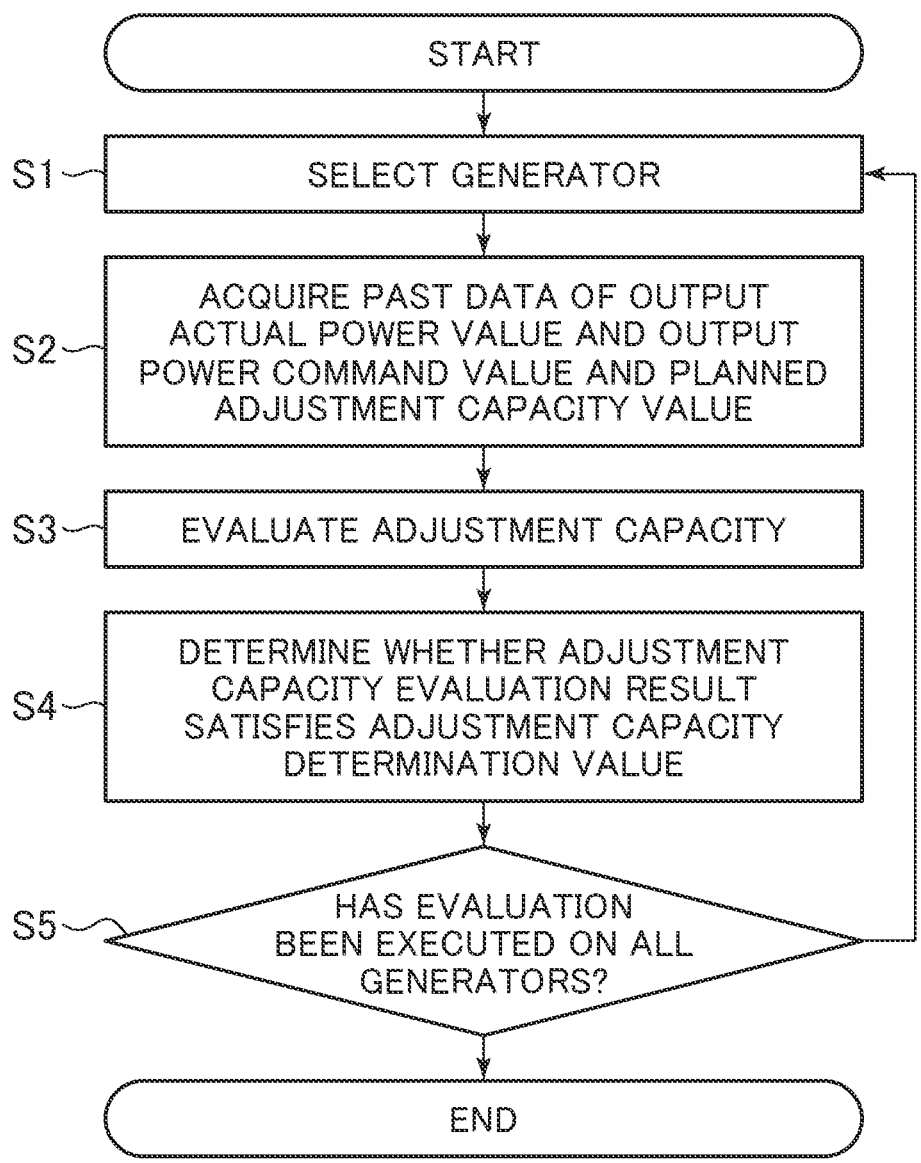
FIG. 3 is an example of a flowchart illustrating a process to be executed by the supply and demand adjustment monitoring device according to the first embodiment of the invention.

The method for evaluating the adjustment capacities by the adjustment capacity evaluation unit 11 is described with reference to FIG. 3. FIG. 3 illustrates a flowchart of a process of monitoring for supply and demand adjustment for the power grid.

In step S1, a single generator or a group of multiple generators is selected from generators that are among the plurality of generators 130 and have adjustment capacities.

In step S2, the adjustment capacity evaluation unit 11 acquires past data of an output actual power value of the selected generator, past data of an output power command value issued to the selected generator, and a planned adjustment capacity value for the selected generator from the output actual power value database DB1, the output power command value database DB2, and the planned adjustment capacity value database DB3.

Figure 4:
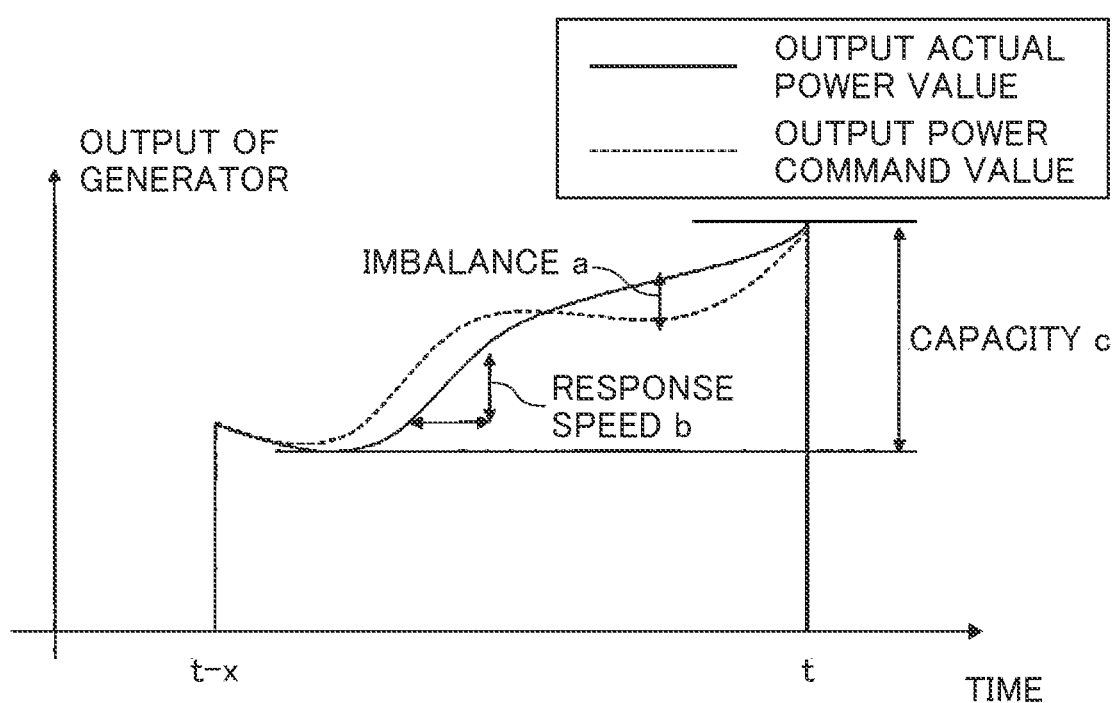
FIG. 4 is an image diagram of evaluation indices of the supply and demand adjustment monitoring device of the power grid according to the first embodiment of the invention.

In step S3, an adjustment capacity of the selected generator is evaluated. FIG. 4 is an image diagram of evaluation indices of the supply and demand adjustment monitoring device 10 of the power grid. In this case, examples of the evaluation indices for a time period from a time t-x to a current time t are an imbalance, a response speed, and a capacity.

The imbalance a is a difference between the output actual power value and the output power command value. As an evaluation index, an average value for the time period from the time t-x to the current time t is used.

The response speed b is the maximum value among changes in output for fixed time sections.

The capacity c is a difference between the maximum and minimum values of the output of the generator for the fixed time sections.

An example of a configuration of a screen of the display unit 21 is described with reference to FIG. 5. FIG. 5 illustrates an example of a screen display showing the evaluation indices of the supply and demand adjustment monitoring device of the power grid.

The adjustment capacity evaluation results calculated by the adjustment capacity evaluation unit 11 are stored in the adjustment capacity evaluation result database DB4. The display unit 21 acquires the adjustment capacity evaluation results stored in the adjustment capacity evaluation result database DB4 and displays the adjustment capacity evaluation results for the generators.

Although FIG. 5 illustrates the example in which the adjustment capacity evaluation results of all the generators are displayed at one time, the displaying is not limited to this. One or multiple adjustment capacity evaluation results of specific one or multiple generators may be displayed. The example in which the adjustment capacity evaluation results calculated by the adjustment capacity evaluation unit 11 are displayed by the display unit 21 after being stored in the adjustment capacity evaluation result database DB4 is described above. However, the adjustment capacity evaluation results output from the adjustment capacity evaluation unit 11 may be directly displayed by the display unit 21.

In step S4, the adjustment capacity evaluation result determination unit 14 determines whether the adjustment capacity evaluation result calculated in step S3 satisfies the adjustment capacity determination value. When the adjustment capacity evaluation result does not satisfy the adjustment capacity determination value, the adjustment capacity evaluation result determination unit 14 may warn with an alarm.

In step S5, whether the evaluation of the adjustment capacities of all the generators has been completed is determined. When the evaluation of the adjustment capacities of all the generators has been completed, the process of the flowchart is terminated. When the evaluation of the adjustment capacities of all the generators has not been completed, the process returns to step S1.

According to the first embodiment, whether the adjustment capacity evaluation results satisfy an amount required to be secured or a planned value can be determined by evaluating the adjustment capacities using the output actual power values, the output power command values, and the planned adjustment capacity values as input. When an adjustment capacity evaluation result does not satisfy the amount required to be secured or the planned value, a general power transmission and distribution company can take measures such as securing an additional adjustment capacity or the like, thereby stably maintaining a frequency. Specifically, the supply and demand adjustment monitoring device of the power grid that can secure a required adjustment capacity and stably supply electric power can be provided.

Second Embodiment

A supply and demand adjustment monitoring device according to a second embodiment of the invention is described with reference to FIGS. 6 to 9. Duplicate descriptions of the details described in the first embodiment are omitted.

Figure 6:
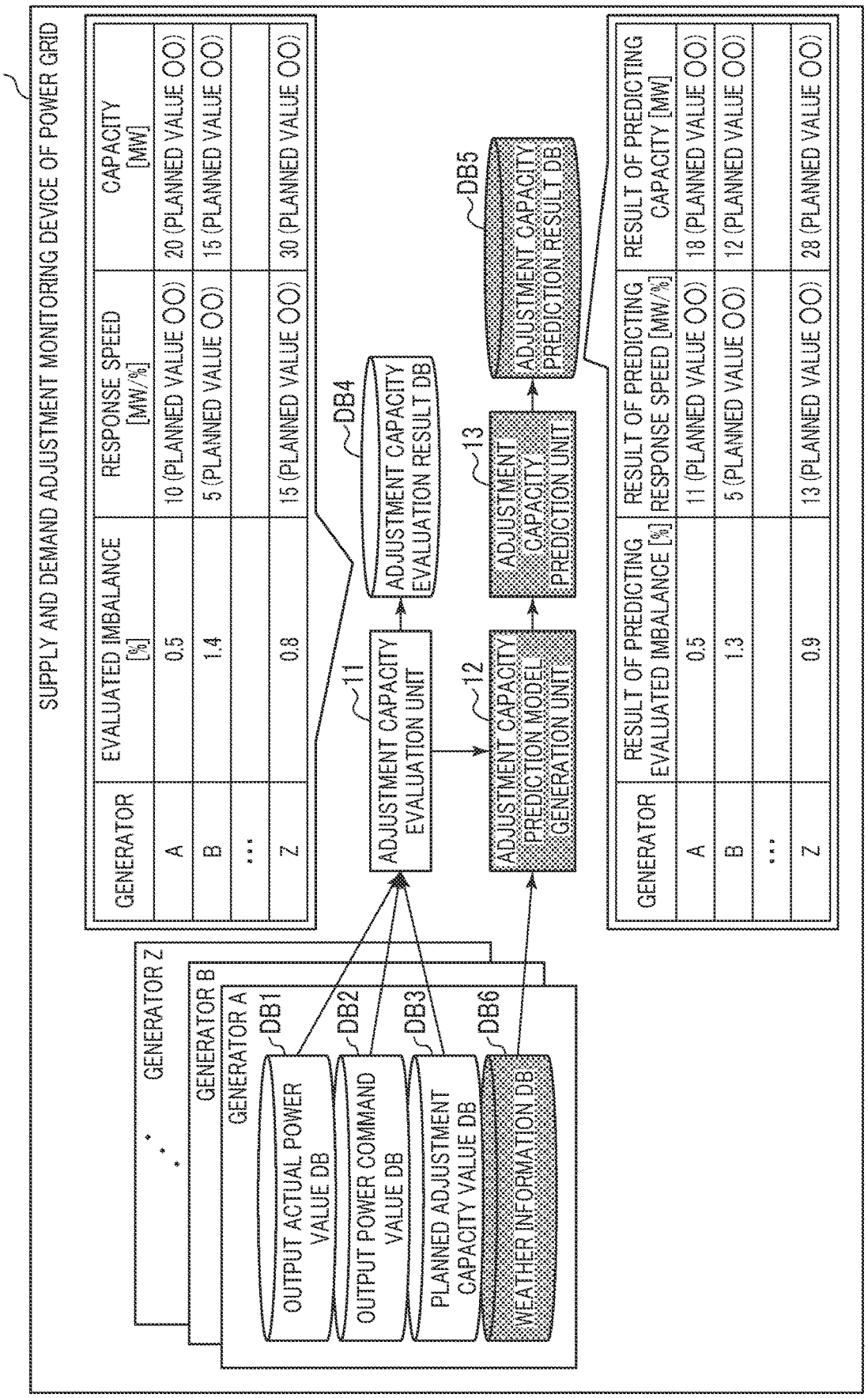
FIG. 6 is an example of a software configuration diagram of a supply and demand adjustment monitoring device of a power grid according to a second embodiment of the invention.

FIG. 6 illustrates the supply and demand adjustment monitoring apparatus 10 of the power grid according to the present embodiment. Differences from the supply and demand adjustment monitoring apparatus of the power grid according the first embodiment are that the supply and demand adjustment monitoring apparatus 10 of the power grid according to the present embodiment further includes an adjustment capacity prediction result database DB5, a weather information database DB6, an adjustment capacity prediction model generation unit 12, and an adjustment capacity prediction unit 13.

In the weather information database DB5, weather information (for example, amounts of solar radiation, wind velocities, and the like) of points where the generators 130 are installed are stored. The weather information is measured by weather observers (actinometers, anemometers, and the like) installed in predetermined ranges from the generators 130.

In the adjustment capacity prediction result database DB6, results of predicting the adjustment capacities of the generators 130 are stored.

The adjustment capacity prediction model generation unit 12 generates an adjustment capacity prediction model by a method described later, based on the adjustment capacity evaluation results input from the adjustment capacity evaluation unit 11 and the weather information acquired from the weather information database DB6.

The adjustment capacity prediction unit 13 uses the adjustment capacity prediction model generated by the adjustment capacity prediction model generation unit 12 and current weather information as input to predict the adjustment capacities by the method described below.

Figure 7:
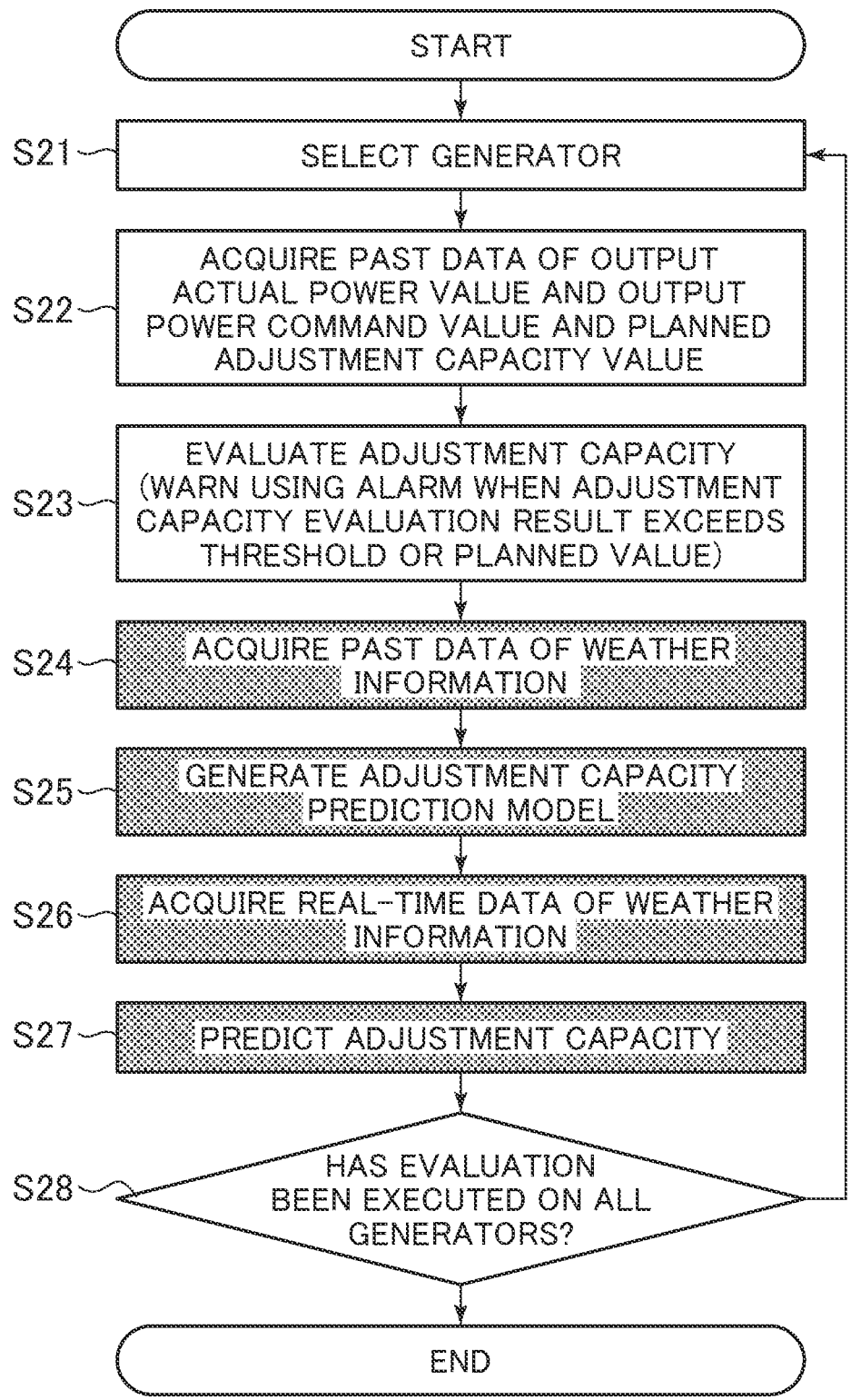
FIG. 7 is an example of a flowchart illustrating a process to be executed by the supply and demand adjustment monitoring device according to the second embodiment of the invention.

The method for generating the adjustment capacity prediction model by the adjustment capacity prediction model generation unit 12 and predicting the adjustment capacities by the adjustment capacity prediction unit 13 is described with reference to FIG. 7. FIG. 7 illustrates a flowchart of a process of monitoring for supply and demand adjustment for the power grid.

Steps S21 to S23 correspond to S1 to S3 illustrated in FIG. 3 in the first embodiment. The steps of selecting one generator or a group of multiple generators from generators having adjustment capacities (S21), acquiring past data of an output actual power value, past data of an output power command value, and a planned adjustment capacity value by the adjustment capacity evaluation unit 11 (S22), and evaluating an adjustment capacity (S23) are the same as the processes illustrated in FIG. 3.

In step S24, the adjustment capacity prediction model generation unit 12 acquires, from the weather information database DB6, past data of weather information (for example, an amount of solar radiation, a wind velocity, and the like) of a point or points where the one or multiple generators 130 are installed.

In step S25, the adjustment capacity prediction model generation unit 12 uses an adjustment capacity evaluation result of evaluating the adjustment capacity in step S23 and the weather information acquired in step S24 as input to generate the adjustment capacity prediction model (regression model or the like). For example, a correlation is obtained using, as input values, a response speed (adjustment capacity evaluation result) and the weather information (amount of solar radiation).

Figure 8:
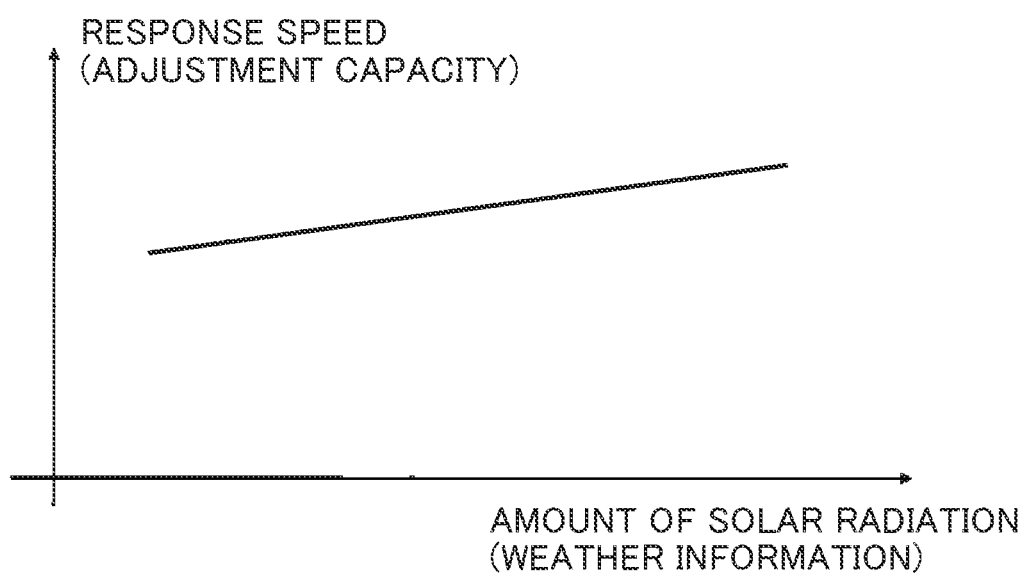
FIG. 8 is an example of an image diagram of an adjustment capacity prediction model of the supply and demand adjustment monitoring device of the power grid according to the second embodiment of the invention.

FIG. 8 illustrates an example of an image diagram of the adjustment capacity prediction model of the supply and demand adjustment monitoring device of the power grid. For example, when the generators having the adjustment capacities are solar power generators, response speeds (adjustment capacities) change depending on the magnitude of amounts of solar radiation.

In step S26, real-time data of weather information (amount of solar radiation, wind velocity, and the like) of the point or points where the one or multiple generators are installed is acquired from one or multiple weather observers (actinometers, anemometers, or the like) installed in a predetermined range from the one or multiple generators 130.

In step S27, the adjustment capacity prediction unit 13 predicts an adjustment capacity using the adjustment capacity prediction model generated in step S25 and the real-time data of the weather information that has been acquired in step S26.

An example of a configuration of a screen of the display unit 21 is described with reference to FIG. 9. FIG. 9 illustrates an example of a screen display showing adjustment capacity prediction results of the supply and demand adjustment monitoring device of the power grid.

The adjustment capacity prediction results calculated by the adjustment capacity prediction unit 13 are stored in the adjustment capacity prediction result database DB5. The display unit 21 acquires the adjustment capacity prediction results stored in the adjustment capacity prediction result database DB5 and displays the adjustment capacity prediction results for the generators.

Although FIG. 9 illustrates the example in which the adjustment capacity prediction results of all the generators are displayed at one time, the displaying is not limited to this. One or multiple adjustment capacity evaluation results of specific one or multiple generators may be displayed. The example in which the adjustment capacity prediction results calculated by the adjustment capacity prediction unit 13 are displayed by the display unit 21 after being stored in the adjustment capacity prediction result database DB5. However, the adjustment capacity prediction results output from the adjustment capacity prediction unit 13 may be directly displayed by the display unit 21.

In step S28, whether the prediction of the adjustment capacities of all the generators has been completed is determined. When the prediction of the adjustment capacities of all the generators has been completed, the process of the flowchart is terminated. When the prediction of the adjustment capacities of all the generators has not been completed, the process returns to step S21.

According to the second embodiment, the adjustment capacities can be predicted by generating the adjustment capacity prediction model using the weather information as input.

There is the probability that the adjustment capacities that can be secured may vary and prediction results may be different from actual power values, depending on weather conditions. However, in the present embodiment, the adjustment capacities can be predicted with high accuracy in consideration of the foregoing probability. In addition, since the general power transmission and distribution company can procure the adjustment capacities based on the accurate prediction results and thus can stably supply electric power.

Third Embodiment

A supply and demand adjustment monitoring device according to a third embodiment of the invention is described with reference to FIGS. 10 to 13. Duplicate descriptions of the details described in the first embodiment are omitted.

Figure 10:
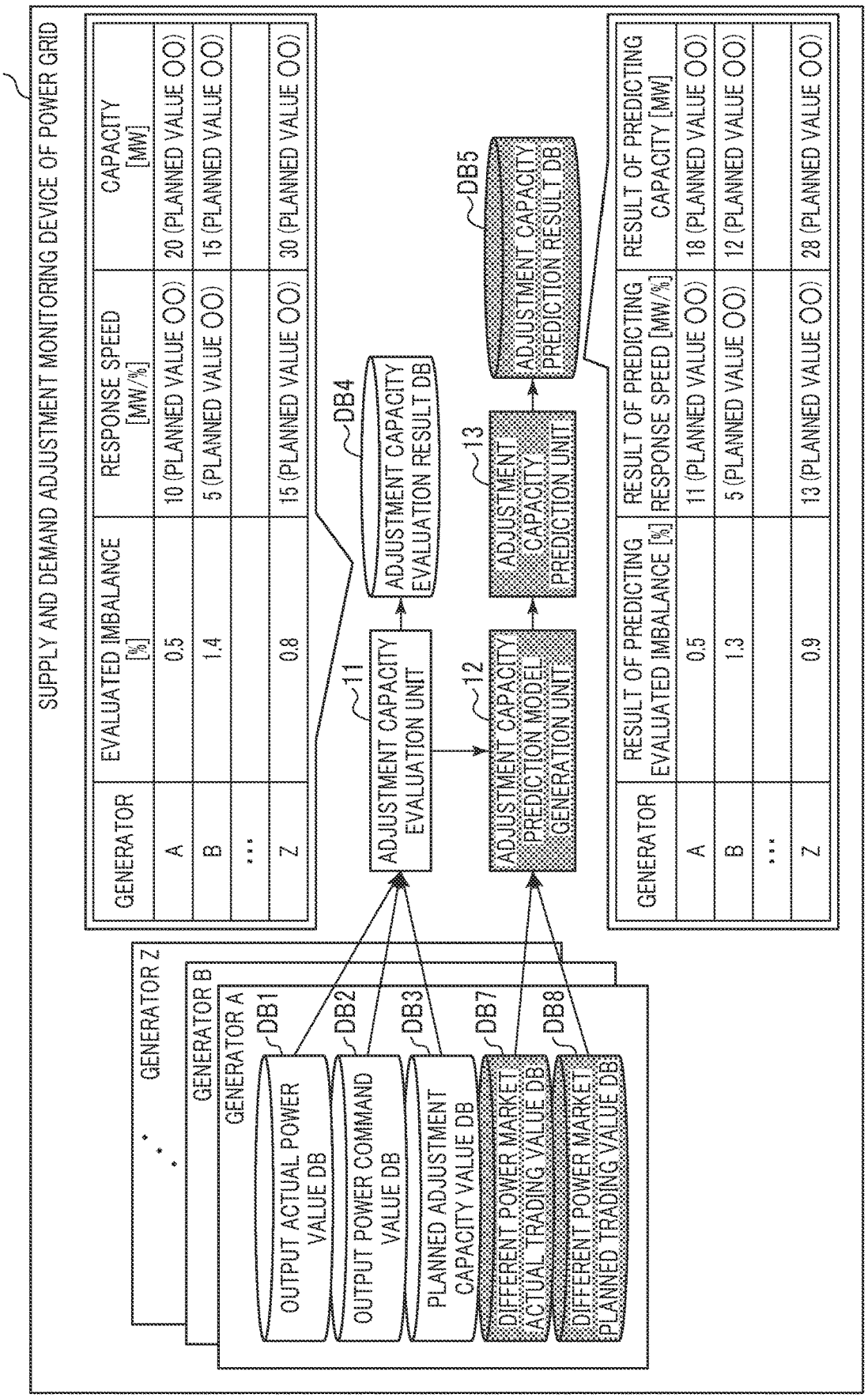
FIG. 10 is an example of a software configuration diagram of a supply and demand adjustment monitoring device of a power grid according to a third embodiment of the invention.

FIG. 10 illustrates the supply and demand adjustment monitoring device 10 of the power grid according to the present embodiment. Differences from the supply and demand adjustment monitoring device according to the first embodiment are that the supply and demand adjustment monitoring device 10 of the power grid according to the present embodiment further includes the adjustment capacity prediction result database DB5, a different power market actual trading value database DB7, a different power market planned trading value database DB8, the adjustment capacity prediction model generation unit 12, and the adjustment capacity prediction unit 13.

In the adjustment capacity prediction result database DB5, results of predicting the adjustment capacities of the generators 130 are stored.

In the different power market actual trading value database DB7, actual trading values in a different power market are stored.

In the different power market planned trading value database DB8, planned trading values in the different power market are stored.

The adjustment capacity prediction model generation unit 12 generates an adjustment capacity prediction model using, as input, the adjustment capacity evaluation results acquired from the adjustment capacity evaluation result database DB4, the actual trading values in the different power market that have been acquired from the different power market actual trading value database DB7, and the planned trading values in the different power market that have been acquired from the different power market planned trading value database DB8.

The adjustment capacity prediction unit 13 predicts the adjustment capacities by inputting the actual trading values in the different power market and the planned trading values in the different power market to the adjustment capacity prediction model described later.

Figure 11:
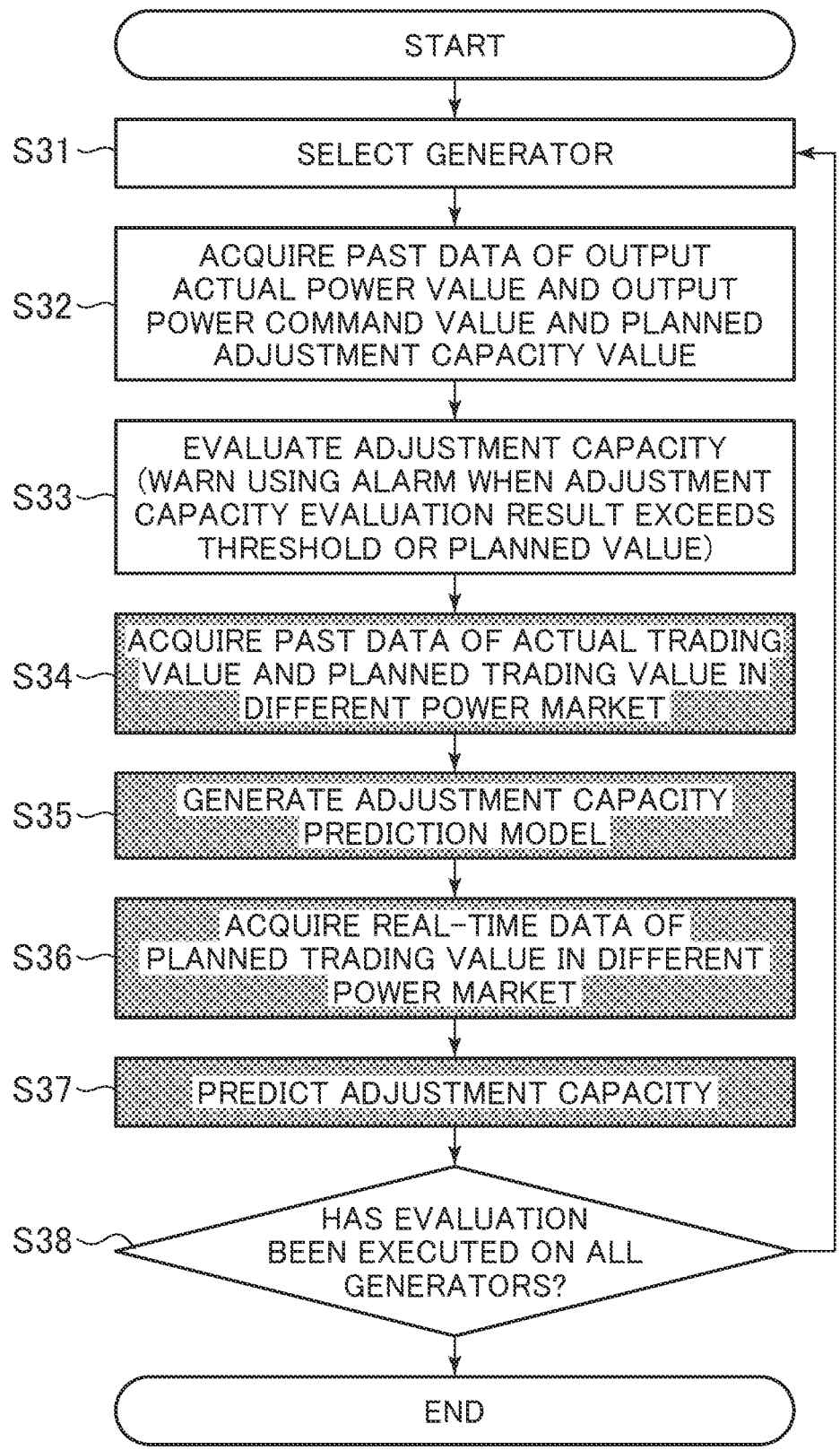
FIG. 11 is an example of a flowchart illustrating a process to be executed by the supply and demand adjustment monitoring device of the power grid according to the third embodiment of the invention.

The method for predicting the adjustment capacities by the adjustment capacity prediction unit 13 is described with reference to FIG. 11. FIG. 11 illustrates a flowchart of a process of monitoring for supply and demand adjustment for the power grid.

Steps S31 to S33 correspond to S1 to S3 illustrated in FIG. 3 of the first embodiment. The steps of selecting a single generator or a group of multiple generators from generators having adjustment capacities (S31), acquiring past data of an output actual power value, past data of an output power command value, and a planned adjustment capacity value by the adjustment capacity evaluation unit 11 (S32), and evaluating an adjustment capacity (S33) are the same as the processes illustrated in FIG. 3.

In step S34, the adjustment capacity prediction model generation unit 12 acquires past data of an actual trading value in the different power market and past data of a planned trading value in the different power market from the different power market actual trading value database DB7 and the different power market planned trading value database DB8.

In step S35, the adjustment capacity prediction model generation unit 12 generates the adjustment capacity prediction model (regression model or the like) using, as input, an adjustment capacity evaluation result of evaluating the adjustment capacity in step S33 and the actual trading value and the planned trading value in the different power market that have been acquired in step S34. For example, a correlation relationship is obtained using, as input values, a difference between the planned value of the adjustment capacity and the actual value of the adjustment capacity and differences between planned and actual trading values in power trading markets A and B.

Figure 12:
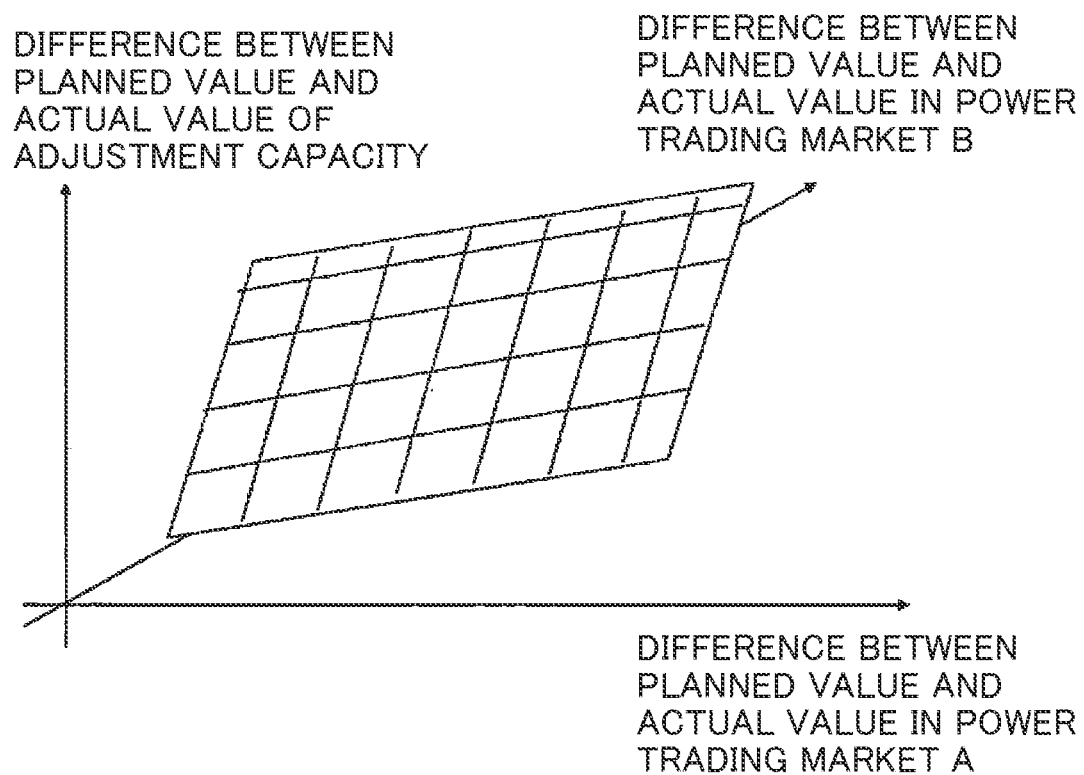
FIG. 12 is an example of an image diagram of an adjustment capacity prediction model of the supply and demand adjustment monitoring device of the power grid according to the third embodiment of the invention.

FIG. 12 illustrates an example of an image diagram of the adjustment capacity prediction model of the supply and demand adjustment monitoring device of the power grid. For example, when a difference between the planned value and the actual value in the power trading market A that is the different power market is large, a difference between the planned value of the adjustment capacity and the actual value of the adjustment capacity can be determined to be large.

In step S36, real-time data of the planned trading value in the different power market is acquired.

In step S37, the adjustment capacity prediction unit 13 predicts the adjustment capacity using the adjustment capacity prediction model generated in step S35 and the real-time data acquired in step S36 and indicating the planned trading value in the different power market.

FIG. 13 illustrates an example of a screen display showing the adjustment capacity prediction results of the supply and demand adjustment monitoring device of the power grid. The adjustment capacity prediction results can be viewed for the generators.

In step S38, whether the prediction of the adjustment capacities of all the generators has been completed is determined. When the prediction of the adjustment capacities of all the generators has been completed, the process of the flowchart is terminated. When the prediction of the adjustment capacities of all the generators has not been completed, the process returns to step S31.

According to the third embodiment, the adjustment capacities can be predicted by generating the adjustment capacity prediction model using, as input, the adjustment capacity evaluation results, the actual trading values in the different power market, and the planned trading values in the different power market.

It is assumed that there are correlations between the actual and planned trading values in the different power market and the adjustment capacities that can be secured. In the present embodiment, the adjustment capacities can be predicted in consideration of the foregoing assumption. In addition, the general power transmission and distribution company can procure the adjustment capacities based on the accurate prediction results and thus can stably supply electric power.

REFERENCE SIGNS LIST

DB1 Output actual power value database
DB2 Output power command value database
DB3 Planned adjustment capacity value database
DB4 Adjustment capacity evaluation result database
DB5 Adjustment capacity prediction result database
DB6 Weather information database
DB7 Different power market actual trading value database
DB8 Different power market planned trading value database
1 Power grid
10 Supply and demand adjustment monitoring device of power grid
11 Adjustment capacity evaluation unit
12 Adjustment capacity prediction model generation unit
13 Adjustment capacity prediction unit
14 Adjustment capacity evaluation result determination unit
21 Display unit
22 Input unit
23 Communication unit
24 CPU
25 Memory
26 Bus line
110 Node
120 Transformer
130 Generator
140 Power transmission line
150 Load
300 Communication network

The invention claimed is:

1. A supply and demand adjustment monitoring device of a power grid, the device comprising:
   an output actual power value database that stores an output actual power value of at least one generator;
   an output power command value database that stores an output power command value issued to the generator;
   a planned adjustment capacity value database that stores, as an evaluation index for evaluating an adjustment capacity of the generator, a planned adjustment capacity value for the generator with respect to any one of a response speed, an imbalance, and a capacity;
   an adjustment capacity prediction result database that stores a result of predicting the adjustment capacity of the generator;
   a weather information database that stores weather information measured by a weather observer, wherein the weather observer is installed in a predetermined range from the generator; and
   a processor coupled to the output power command value database, the planned adjustment capacity value database, the adjustment capacity prediction result database, the adjustment capacity prediction result database and the weather information database, that is programmed to:
   obtain, using any one of a response speed, an imbalance, and a capacity, between the output actual power value and the output power command value of the generator, as the evaluation index for the adjustment capacity of the generator, the evaluation index of the planned adjustment capacity value and the evaluation index of the adjustment capacity, as an adjustment capacity evaluation result;

generate an adjustment capacity prediction model based on past weather information and the adjustment capacity evaluation result of evaluating the adjustment capacity;

predict the adjustment capacity based on the adjustment capacity prediction model, and current weather information measured by the weather observer;

store a result of predicting the adjustment capacity of the generator; and determine whether the adjustment capacity evaluation result of evaluating the adjustment capacity satisfies an adjustment capacity determination value using the output actual power value of the generator, the output power command value and the planned adjustment capacity value as inputs, and determine a required additional adjustment capacity for the power grid when the adjustment capacity evaluation result does not satisfy the planned adjustment capacity value for the generator, wherein the required adjustment capacity is secured to stably supply electric power on the power grid.

2. The supply and demand adjustment monitoring device of a power grid, according to claim 1, wherein the result of predicting the adjustment capacity of the generator, stored in the adjustment capacity prediction result database, is obtained with respect to the generator in a first market, the supply and demand adjustment monitoring device further comprising:

a different power market actual trading value database that stores an actual trading value in a different market; and a different power market planned trading value database that stores a planned trading value in the different market, wherein the processor is further programmed to:

generate an adjustment capacity prediction model based on a past actual trading value in the different market, a past planned trading value in the different market, and an adjustment capacity evaluation result of evaluating the adjustment capacity; and predict the adjustment capacity based on the adjustment capacity prediction model, a current actual trading value in the different market, and a current planned trading value in the different market.

3. The supply and demand adjustment monitoring device of a power grid, according to claim 2, wherein the processor is further programmed to predict the magnitude of a difference between a planned value of the adjustment capacity and an actual value of the adjustment capacity based on the magnitude of a difference between the current actual trading value in the different market and the current planned trading value in the different market.

4. A supply and demand adjustment monitoring method for a power grid, to be performed using a computer, the method comprising:

using, as an evaluation index for evaluating an adjustment capacity of the generator, a planned adjustment capacity value with respect to any one of a response speed, an imbalance, and a capacity, and using any one of a response speed, an imbalance, and a capacity, between an output actual power value and an output power command value of the generator, as an evaluation index for the adjustment capacity of the generator, obtaining the evaluation index of the planned adjustment capacity value and the evaluation index of the adjustment capacity, as an adjustment capacity evaluation result;

generating an adjustment capacity prediction model, based on past weather information measured by a weather observer installed in a predetermined range from the generator, and the adjustment capacity evaluation result; and predicting the adjustment capacity based on the adjustment capacity prediction model and a current weather information;

determining whether the adjustment capacity evaluation result of evaluating the adjustment capacity satisfies an adjustment capacity determination value using the output actual power value of the generator, the output power command value and the planned adjustment capacity value as inputs, and determining a required additional adjustment capacity for the power grid when the adjustment capacity evaluation result does not satisfy the planned adjustment capacity value for the generator; and securing the required adjustment capacity to stably supply electric power on the power grid.

5. The supply and demand adjustment monitoring method for a power grid, according to claim 4, wherein the result of predicting the adjustment capacity of the generator is obtained with respect to the generator in a first market, the supply and demand adjustment method further comprising:

generating an adjustment capacity prediction model based on a past actual trading value in a different market, a past planned trading value in the different market, and a result of evaluating the adjustment capacity; and predicting the adjustment capacity based on the adjustment capacity prediction model, a current actual trading value in the different market, and a current planned trading value in the different market.

* * * * *